(12) United States Patent
Borza

(10) Patent No.: US 6,429,927 B1
(45) Date of Patent: Aug. 6, 2002

(54) IMAGING DEVICE, ESPECIALLY FOR OPTICAL FINGERPRINTING

(75) Inventor: Stephen J. Borza, Ottawa (CA)

(73) Assignee: Activcard Ireland, Limited, Dublin (IE)

( * ) Notice: Subject to any disclaimer, the term of this patent is extended or adjusted under 35 U.S.C. 154(b) by 0 days.

(21) Appl. No.: 09/471,118

(22) Filed: Dec. 23, 1999

(51) Int. Cl.⁷ .................................................. G06K 9/74
(52) U.S. Cl. ...................................................... 356/71
(58) Field of Search ....................... 356/71; 382/124–127

(56) References Cited

U.S. PATENT DOCUMENTS

| | | | |
|---|---|---|---|
| 5,138,468 A | * | 8/1992 | Barbanell .................... 356/71 |
| 5,187,748 A | * | 2/1993 | Lee .............................. 356/71 |
| 5,241,606 A | * | 8/1993 | Horie ........................... 356/71 |

* cited by examiner

Primary Examiner—Frank G. Font
Assistant Examiner—Amanda Merlino
(74) Attorney, Agent, or Firm—Freedman & Associates

(57) ABSTRACT

An optical imaging device such as a fingerprint imager has a prism or another light transmitting element, a light source for illuminating a finger placed on the prism, and a CCD image sensor for receiving a light beam reflected from the finger-contacted surface. A modified optical lens is used to focus and redirect the reflected light beam. The lens has a relatively small reflective coating in the middle of its back surface, the reflective coating constituting an optical iris. The modified lens is effective to partly correct for peripheral aberration, perspective distortion and depth-of-field image distortion of the device and gives rise to a compact design of the device.

16 Claims, 3 Drawing Sheets

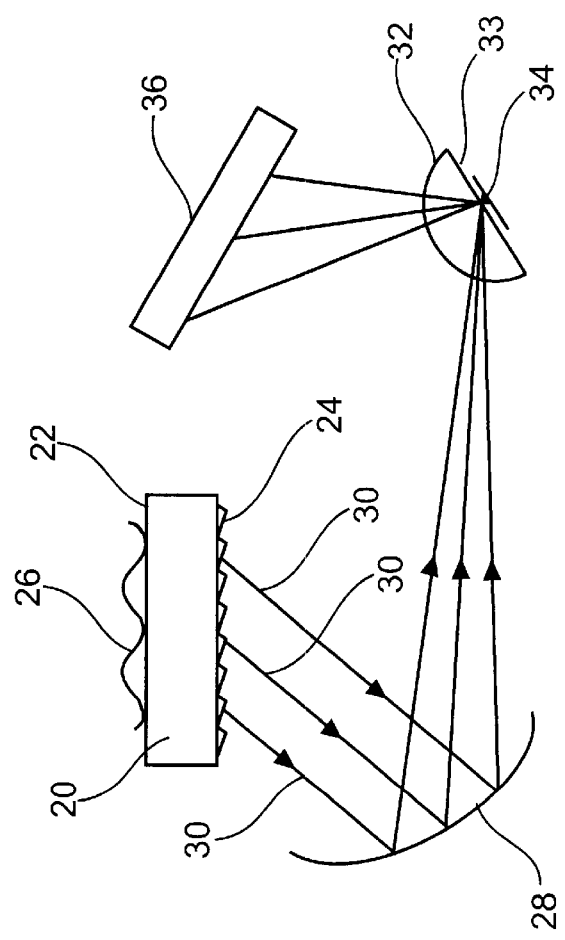
Figure 2
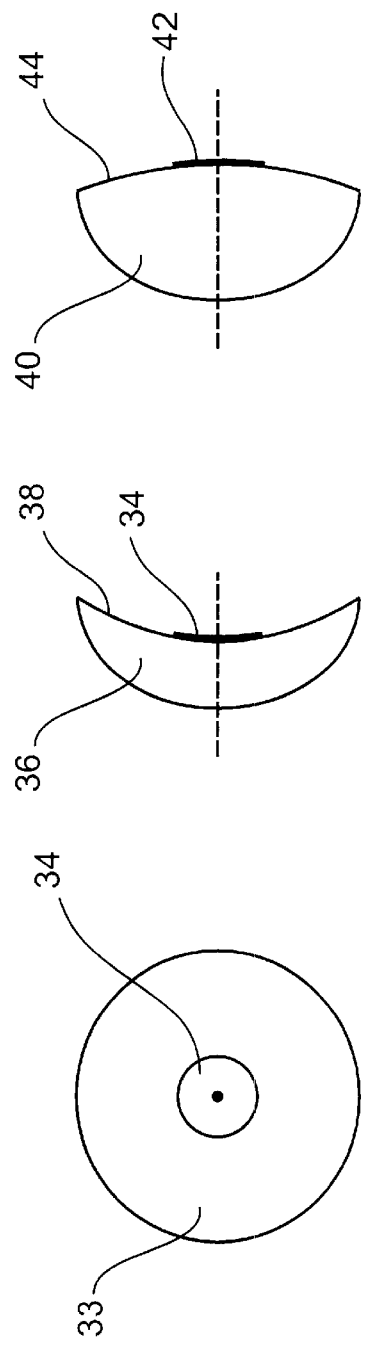
Figure 5
Figure 4
Figure 3

IMAGING DEVICE, ESPECIALLY FOR OPTICAL FINGERPRINTING

This invention relates to an imaging device for generating a two-dimensional image such as a fingerprint image.

BACKGROUND OF THE INVENTION

Fingerprinting devices have been known for a number of years. In a simple version, a fingerprinting device may have a prism or another light-transmitting member having a first surface at which light transmitted through the member may undergo frustrated total internal reflection, a lens, a source of light emitting an interrogating beam, and an image sensor. A finger is placed on one of the surfaces of the prism, and the interrogating beam of light is directed onto another, illumination surface of the prism or the member so as to illuminate from within the prism or member the first surface on which the finger is placed. In accordance with a well-known principle of frustrated total internal reflection, the beam of light will be reflected from the finger-contacted surface substantially only at points where the finger does not touch the prism. The reflected light exits the prism or optical member through another surface thereof. Since, as is well known, the surface of any human finger is covered with characteristic ridges and recesses which create a unique pattern known as fingerprint, the reflected light which exits the prism carries the fingerprint image. The image can be sensed, retrieved and registered if necessary, using known means. The lens serves to focus the reflected beam of light to a certain degree to facilitate a further transmission of the beam.

In some devices, e.g. as described in U.S. Pat. No. 5,187,748, the illumination surface is at an acute angle to the first surface. In other cases, as seen for example in U.S. Pat. No. 5,233,404, the illumination surface is parallel to the first surface.

In a typical arrangement, illustrated herein in FIG. 1 as a Prior Art, the prism is triangular in cross-section. The finger under investigation is pressed against a first surface of the prism. An interrogating light beam is directed onto the first surface of the prism through another surface (illumination surface) of the prism and exits through a viewing principle of frustrated total internal reflection. The reflected beam passes through a lens (or a lens system) which is disposed at a distance from the prism, and is then directed onto an image sensor, e.g. a charge coupled device (CCD) or the like for converting the fingerprint image into an electric signal. It is evident that the image arriving at the lens is not a true image of the fingerprint as the surface of the finger in contact with the prism is not parallel to the lens (more specifically, to the plane of symmetry of the lens indicated with a dotted line on FIG. 1). Even when the light transmitting element is a plate, the analyzed object cannot be positioned parallel to the lens. Consequently, one end of the contact surface will be closer to the lens than the other end, and as a result, the fingerprint image will be somewhat distorted. The use of angled surfaces induces a perspective effect to measured biometric data. This perspective effect is very much the same as when a picture is angled away from a viewer. It can be said that the device of the above-defined type is inherently non-symmetrical.

It is known to use a diaphragm associated with the lens to prevent light propagating from the prism through the lens from reaching a peripheral portion of the lens where peripheral aberration typically occurs in standard lenses. The diagram has an opening in the centre that is coaxial with the optical axis of the lens and functions as an iris.

It is desirable to eliminate or correct for peripheral aberration and perspective distortion in optical fingerprint readers without a substantial reduction in imaged information. It is also desirable to reduce or eliminate the depth-of-field distortion that is due to the relative short optical path of the beam carrying the desired information. All the above corrections should desirably be effected, however, without a significant increase in the size of the apparatus.

SUMMARY OF THE INVENTION

In accordance with the invention, there is provided an optical imaging device comprising:

a light transmitting element having at least a first surface on which an imaged object can be placed and at which incident light beam transmitted through the light transmitting element may undergo frustrated total internal reflection, and a second surface through which light reflected from the first surface may exit as a reflected beam, an image sensor disposed at a distance from the light transmitting element for receiving an image of said object from said light transmitting element, a lens disposed in the light path of said reflected beam between the light transmitting element and the sensor for focusing said reflected beam and thus produce a focused beam, the lens having two dissimilar surfaces, a first refractive convex surface facing the incident reflected beam from the light-transmitting element, and a second surface having a significantly lesser curvature than said first convex surface, and a reflective means disposed adjacent to said second surface for reflecting said reflected beam passed through said refractive surface, onto said image sensor so that an image of said object can be detected.

In keeping with the meaning of the word "adjacent", the reflective surface (adjacent to the second surface) may be applied to the second surface or may be spaced therefrom by a distance not preventing the reflection of the incident beam back through the first surface and onto the sensor.

The second surface of the lens may be flat, or it may have a curvature that is significantly smaller than the curvature of the first, refractive surface that is turned towards the reflected beam from the light transmitting element. The curvature is not limited to spherical or regular aspheric. It should be selected to at least partly correct for the depth-of-field distortion of the system.

The light transmitting element may be embodied by a prism, a plate with parallel major surfaces, or a platen having one flat surface against which an analyzed object may be pressed and a plurality of parallel elongated prisms on the other surface.

Preferably, the reflective surface is sized to correspond only to a portion of the second surface, the portion defining a working area of the second surface about the optical axis of the lens. This serves to minimize the typical peripheral Gaussian distortion of spherical lenses that becomes larger as the light passes farther away from the optical axis of the lens i.e. closer to the periphery of the lens.

The device may further comprise other reflective surfaces in the optical path of said reflected beam between the light transmitting element and said sensor, to fold the optical path for space saving purposes.

BRIEF DESCRIPTION OF THE DRAWINGS

In the drawings,

FIG. 2 is a schematic view of an embodiment of the device of the present invention.

FIG. 3 is a back view of the lens of the device, with a reflective coating thereon, FIG. 4 is a side view of another version of the lens, FIG. 5 is a side view of still another embodiment of the lens.

DETAILED DESCRIPTION OF THE INVENTION

Figure 1:
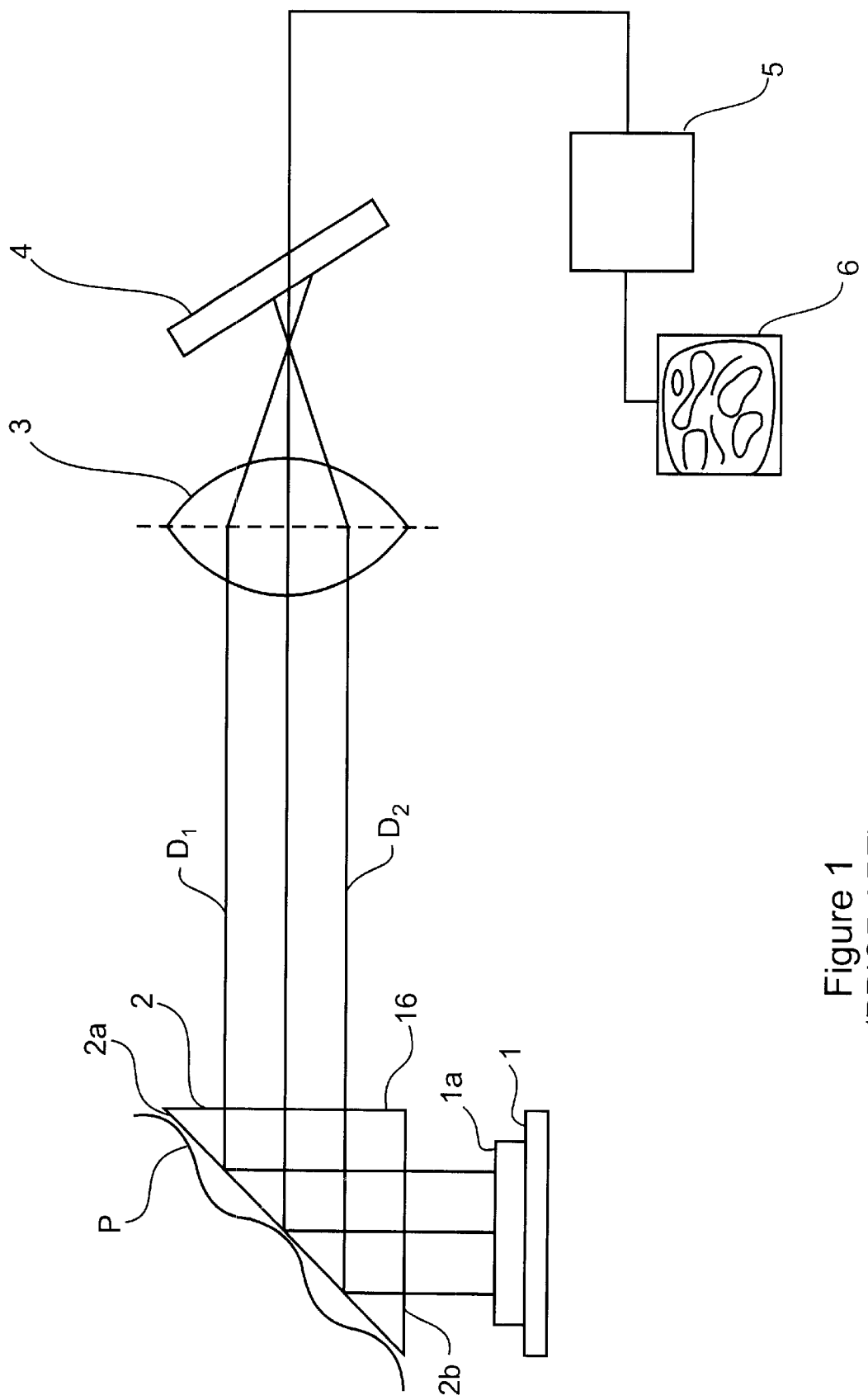
FIG. 1 is a schematic side view of a prior art apparatus for imaging fingerprints.

FIG. 1 shows schematically the design of a known type of optical apparatus. This apparatus comprises a light source 1 and a diffuser 1a for emitting a light beam to the subject fingerprint "P". A triangular prism 2 includes a slant surface 2a of about 45° inclination angle on which the fingerprint P is laid. An image producing lens 3 (with the plane of symmetry shown with a dashed line) is provided for receiving the reflected light beam from the valleys of the subject fingerprint laid on the prism 2 and then producing an image of the subject fingerprint P at an area charge coupled device 4 (hereinafter referred to simply as "the area CCD") for converting the produced fingerprint image into an electric signal. The apparatus further includes an amplifying/analyzing circuit 5 (signal processing circuit) for amplifying then analyzing the electric signal for the subject fingerprint provided by the area CCD 4, and a monitor 6 for displaying the fingerprint shown. The transparent triangular prism 2 can be made of glass or another suitable material. Other prism shapes such as polygonal e.g. tetragonal may also be employed. The index of refraction of the prism material is preferably in the range of about 1–2.

A fingerprint viewing face 16 is disposed at an acute angle, typically of about 45–50°, to the fingerprint receiving face 2a. It will be noted that there is a difference between the optical path lengths D1 and D2 denoting the distance between one end of the fingerprint (as pressed against the surface 2a) and the other end.

To compensate for this difference and the resulting distortion of the fingerprint image, the CCD array 4 is tilted to a degree. This measure, however, is not fully satisfactory and a distortion of the image, being the sum of perspective distortion, depth-of-field distortion and peripheral aberration, still remains.

It is known that the depth of field decreases as the distance between the prism and the image sensor (CCD) decreases. There is obviously a need to keep the size of an imaging device to a minimum and this places increasing limits on acceptable tolerances of the optical components and their respective placement. The size of the prism is determined by the size of a typical human finger to be analyzed. Assuming a right angle prism and the angle between the finger-receiving surface 2 and the viewing surface 16 being about 45 degrees, the minimum size of the illuminating surface 2b is also determined. It is known that the distance between the prism and the lens 3 should be larger than the size of the illuminating surface 2b. Since it is advantageous and desirable to reduce the overall size of the device, it follows that it is also desirable to reduce the size of the illuminating surface and also the total length of the optical path.

As seen in FIG. 2, a fingerprint imaging device of the invention has a light transmitting platen 20 having a flat surface 22 on one side and an array of microprisms 24 on the other side. A finger 26 is shown schematically pressed against the flat surface 22 and illuminated by a light source, not shown. A focusing reflective mirror 28 is placed such as to receive light beams 30 reflected from the flat surface 22, the beams transmitting an initial fingerprint image. The mirror reflects and focuses the beams 30 onto a convex-planar lens 32. The lens is positioned such that its flat or substantially flat face 33 is disposed at an acute angle to the incident beams 30. The distance between the mirror 28 and the lens 32 corresponds essentially to the focal length of the mirror. As a result, the beams 30 focus on a small portion of the lens 32 rather than on its entire area.

A reflective surface 34, exemplified by a reflective film applied on the planar surface of the lens about its optical axis, is placed on the planar face 33. A CCD array 36 is positioned such as to receive focused beams 38 that are reflected from the reflective surface 34 and pass again through the lens 32. The CCD array may optionally be tilted relative to the planar face 33 to further correct, if necessary, for the perspective distortion of the fingerprint image within the optical path.

The advantage of the reflective surface 34 disposed adjacent to, or applied on the back surface 33 of the lens 32 as seen in FIG. 3, is twofold. First, it facilitates optical correction to occur at or near the centre of the lens, which is obviously advantageous to reduce peripheral aberration, as known by those skilled in the art. Secondly, the reflective surface being much smaller than the diameter of the lens, acts similarly to an iris about the centre of the lens.

The mirror 28 is not an essential part of the invention, and serves mostly, as mentioned herein, to fold the optical path for space saving purposes.

In an alternative embodiment of the lens, shown in FIG. 4, the lens 32 is a convex-concave lens 36 with a reflective surface 34 applied contiguously to its back surface 38.

In the embodiment shown in FIG. 5, the lens is a double convex lens 40 with a reflective coating 42 on its back surface 44. In both FIG. 3 and FIG. 4, the curvature of the back surfaces 38, 44 of the lens is significantly lesser than the curvature of the front surface facing the incident beam from the prism or platen. This obviously also applies to the flat or substantially flat surface 33 of the lens of FIG. 2. The curvature of the back surface may, if desired, be different than flat or aspheric. It may be contoured as required, still maintaining the relatively lower curvature than the front surface, to assist in correcting the distortion of the particular optical path.

Figure 6:
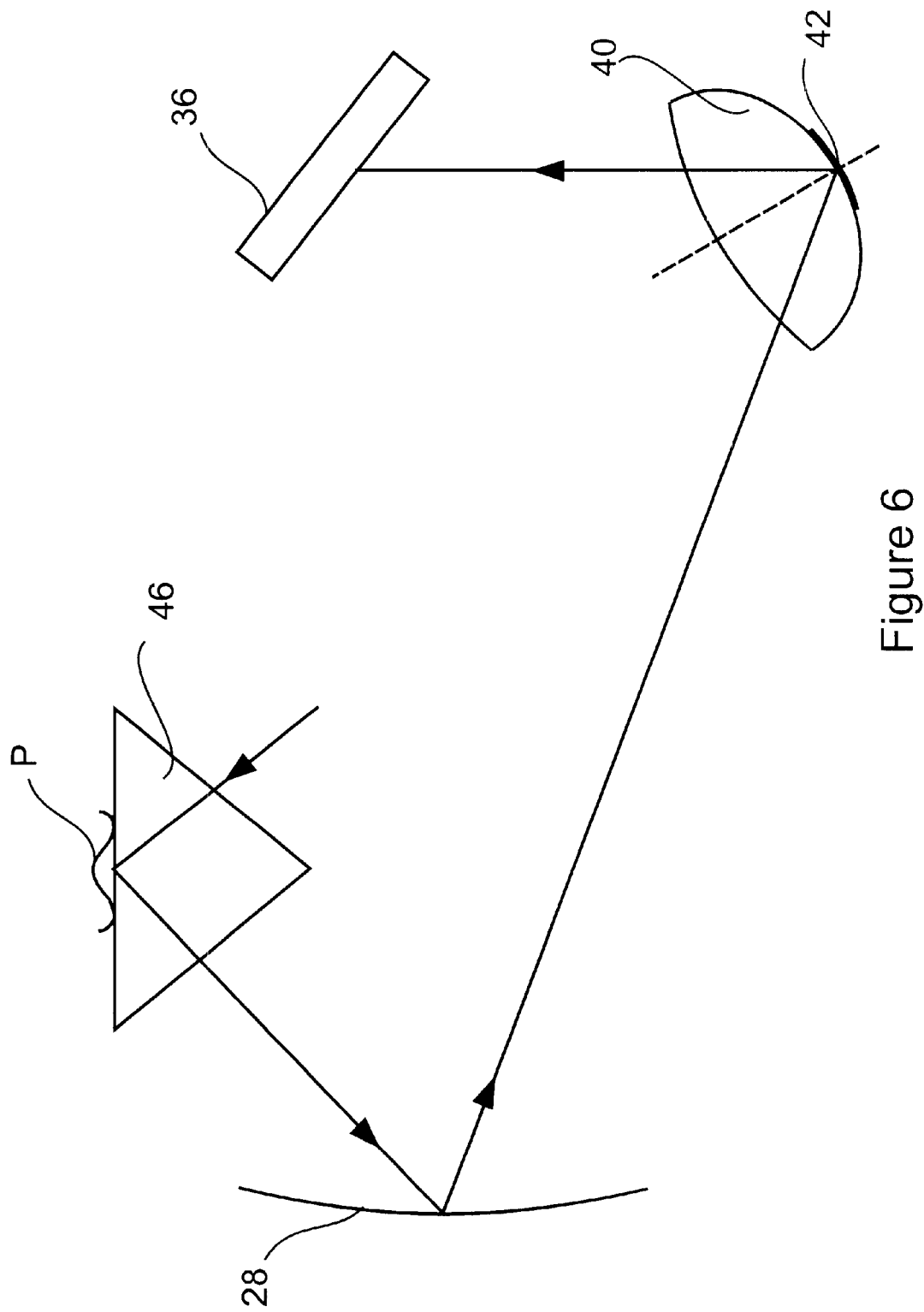
FIG. 6 is of still another embodiment of the device.

FIG. 6 illustrates an embodiment of the invention in which a triangular prism 46 is used rather than the platen of FIG. 2, and a convex-convex lens 40 is employed with the reflected coating 42 applied on the back surface of the lens. The other elements and reference numerals correspond to those of other figures, and some elements (light source, analyzing circuit, monitor) have been omitted for clarity.

It will be apparent to those skilled in the art that the provision of the lens with a reflective pupil on the back surface is a space-saving means since the information-carrying light beam is "folded" at the lens.

Of course, numerous other embodiments may be envisaged without departing from the spirit and scope of the invention, and such embodiments and modifications will be apparent to those versed in the art.

What is claimed is:

1. An optical imaging device comprising
   a light transmitting element having at least a first surface on which an imaged object can be placed and at which incident light beam transmitted through the light transmitting element may undergo frustrated total internal reflection, and a second surface through which light reflected from the first surface may exit as a reflected beam, an image sensor disposed at a distance from the light transmitting element for receiving an image of said object from said light transmitting element, a lens disposed in the path of said reflected beam between the light transmitting element and the sensor for focusing said reflected beam to produce a focused beam, the lens having two dissimilar surfaces, a first refractive convex surface facing the incident reflected beam from the light-transmitting element, and a second surface having a significantly lesser curvature than said first convex surface, and a reflective surface disposed adjacent said second surface for reflecting said reflected beam through said refractive surface, onto said image sensor so that an image of said object can be detected, wherein the incident reflected beam passes through said refractive surface immediately before reflection off of the reflective surface and the reflected beam passes through said refractive surface immediately after reflection off of the reflective surface.

2. The device according to claim 1 wherein said reflective surface is sized to correspond to a portion of said second surface about the optical axis of the lens.

3. The device according to claim 2 wherein said second surface is substantially flat.

4. The device according to claim 2 wherein said second surface is convex.

5. The device as defined in claim 2 wherein said second surface is concave.

6. The device according to claim 2 wherein said reflective surface is contiguously attached to said second surface of said lens.

7. The device as defined in claim 6 wherein said light transmitting element is a triangular prism.

8. The device as defined in claim 7 further comprising a reflective focusing surface disposed between said light transmitting element and said lens for directing and focusing a reflected beam from said element onto said lens.

9. The device according to claim 6 wherein said light transmitting element is a platen having a first flat surface and a second surface with an array of triangular solids thereon.

10. The device as defined in claim 9 further comprising a reflective focusing surface disposed between said light transmitting element and said lens for directing and focusing a reflected beam from said element onto said lens.

11. The device as defined in claim 2 wherein said image sensor is a CCD array.

12. An optical imaging device comprising a light transmitting element having at least a first surface on which an imaged object can be placed and at which incident light beam transmitted through the light transmitting element may undergo frustrated total internal reflection, and a second surface through which light reflected from the first surface may exit as a reflected beam, an image sensor disposed at a distance from the light transmitting element for receiving an image of said object from said light transmitting element, a lens disposed in the path of said reflected beam between the light transmitting element and the sensor for focusing said reflected beam to produce a focused beam, the lens having two dissimilar surfaces, a first refractive convex surface facing the incident reflected beam from the light-transmitting element, and a second surface having a significantly lesser curvature than said first convex surface, and a reflective coating applied contiguously on said second surface about the optical axis of said lens and sized to correspond to a portion less than the whole of said second surface, for reflecting said reflected beam passed through said refractive surface, onto said image sensor so that an image of said object can be detected.

13. The device according to claim 12 wherein the second surface is substantially flat.

14. The device according to claim 12 further comprising a reflective focusing surface disposed between said light transmitting element and said lens for directing and focusing a reflected beam from said element onto said lens.

15. The device according to claim 13 wherein said image sensor is a CCD.

16. The device according to claim 15 wherein said image sensor is disposed at an acute angle relative to the optical plane of said lens.

* * * * *